United States Patent
Tomooka

(10) Patent No.: US 11,392,254 B2
(45) Date of Patent: Jul. 19, 2022

(54) SENSOR

(71) Applicant: SEKISUI POLYMATECH CO., LTD., Saitama (JP)

(72) Inventor: Shinichi Tomooka, Saitama (JP)

(73) Assignee: SEKISUI POLYMATECH CO., LTD., Saitama (JP)

( * ) Notice: Subject to any disclaimer, the term of this patent is extended or adjusted under 35 U.S.C. 154(b) by 0 days.

(21) Appl. No.: 17/298,306

(22) PCT Filed: Dec. 17, 2019

(86) PCT No.: PCT/JP2019/049278
§ 371 (c)(1),
(2) Date: May 28, 2021

(87) PCT Pub. No.: WO2020/129932
PCT Pub. Date: Jun. 25, 2020

(65) Prior Publication Data
US 2022/0019314 A1    Jan. 20, 2022

(30) Foreign Application Priority Data

Dec. 19, 2018 (JP) .............................. JP2018-237083

(51) Int. Cl.
*G06F 3/044* (2006.01)
(52) U.S. Cl.
CPC ................................. *G06F 3/0443* (2019.05)
(58) Field of Classification Search
None
See application file for complete search history.

(56) References Cited

U.S. PATENT DOCUMENTS 9,122,088 B2 * 9/2015 Omote ................ G06F 3/04164
11,182,032 B2 * 11/2021 Kwon .................... G06F 3/0445
(Continued)

FOREIGN PATENT DOCUMENTS

JP    2011-221947 A    11/2011
JP    2013109520 A *   6/2013    ............. G06F 3/041
(Continued)

OTHER PUBLICATIONS

International Search Report for PCT Patent App. No. PCT/JP2019/049278 (dated Mar. 17, 2020) with English language translation thereof.

*Primary Examiner* — Duane N Taylor, Jr.
(74) *Attorney, Agent, or Firm* — Cermak Nakajima & McGowan LLP; Tomoko Nakajima

(57) ABSTRACT

A sensor includes a base member and a sensor sheet. The sensor sheet includes a film sheet, a plurality of sensor electrodes laid on the film sheet, a plurality of wiring lines laid on the film sheet to conduct electricity to the plurality of sensor electrodes, and a detection part and a tail part. The detection part is held on the base member and includes the plurality of sensor electrodes. The tail part extends from the detection part in a manner so as to face a bottom surface of the base member and includes the plurality of wiring lines. The tail part includes a bent portion bent on a bottom surface periphery of the base member toward the bottom surface of the base member. The plurality of wiring lines extending through the bent portion are laid on an outer bent surface of the bent portion.

8 Claims, 8 Drawing Sheets

(56) References Cited

U.S. PATENT DOCUMENTS

| | | | |
|---|---|---|---|
| 2011/0254805 A1 | 10/2011 | Tanimizu et al. | |
| 2014/0218053 A1* | 8/2014 | Ullmann ............... | G06F 3/0445 |
| | | | 324/658 |
| 2015/0168997 A1 | 6/2015 | Matsuoka et al. | |
| 2017/0090661 A1 | 3/2017 | Kim et al. | |
| 2017/0192574 A1 | 7/2017 | Koike et al. | |

FOREIGN PATENT DOCUMENTS

| | | |
|---|---|---|
| JP | 2013-247029 A | 12/2013 |
| JP | 2016-219049 A | 12/2016 |
| JP | 2018-060411 A | 4/2018 |
| WO | WO2016/039047 A1 | 3/2016 |

* cited by examiner

Comparative Example 1

Comparative Example 1

Comparative Example 1

Comparative Example 2

Comparative Example 2

Comparative Example 2

SENSOR

This application is a national phase entry under 35 U.S.C. § 371 of PCT Patent Application No. PCT/JP2019/049278, filed on Dec. 17, 2019, which claims priority under 35 U.S.C. § 119 to Japanese Patent Application No. 2018-237083, filed Dec. 19, 2018, both of which are incorporated by reference.

TECHNICAL FIELD

The present invention relates to a sensor designed mainly for input operation on various electronic devices and, more specifically, to a capacitive sensor.

BACKGROUND ART

Electronic devices of various kinds are equipped with their respective operation devices for touch input operation. Capacitive sensors find use as sensors that detect input operation. Such a capacitive sensor includes mainly a base member and a film sheet. The base member is made of, for example, rigid resin, and the film sheet is a resin film. The film sheet includes a detection part held on the base member and a tail part extending out from the detection part.

The detection part is held on the base member. The detection part includes sensor electrodes and wiring lines extending from the sensor electrodes. The sensor electrodes and the wiring lines are printed with conductive ink. The tail part extends out from the detection part. The tail part is not held on the base member such that wiring lines may be routed in a flexible way suited to the layout of components within a casing of an electronic device. Wiring lines extending from the sensor electrodes are laid on the tail part. These wiring lines are a direction extension of the wiring lines included in the detection part. A terminal portion is provided to ends of the wiring lines. The terminal portion is connected to a connector of a circuit board disposed in the casing of the electronic device. Such a conventional capacitive sensor is disclosed in, for example, Japanese Unexamined Patent Application Publication No. 2013-247029 (PTL 1).

CITATION LIST

Patent Literature

PTL 1: Japanese Unexamined Patent Application Publication No. 2013-247029

SUMMARY OF INVENTION

Technical Problem

The drawback to the conventional capacitive sensor is that the tail part can be accidentally bent when, for example, the sensor is placed in the casing of the electronic device, or more specifically, when the terminal portion is connected to the connector. In some cases, the tail part is intentionally bent in such a way as to conform to the placement of the circuit board. On the downside, the wiring lines on a bent portion formed by the bending of the tail part can peel from the film sheet and will consequently break.

The present invention has been made against a backdrop of the techniques known in the art. It is an object of the present invention to reduce the possibility that wiring lines of a sensor, such as a capacitive sensor, will break due to bending of a tail part extending from a detection part.

Solution to Problem

To attain the objective, a sensor according to an aspect of the present invention is as follows.

An aspect of the present invention pertains to a sensor including a base member and a sensor sheet. The sensor sheet includes a film sheet, a plurality of sensor electrodes laid on the film sheet, and a plurality of wiring lines laid on the film sheet to conduct electricity to the plurality of sensor electrodes. The sensor sheet includes a detection part and a tail part. The detection part is held on the base member and includes the plurality of sensor electrodes. The tail part extends from the detection part in a manner so as to face a bottom surface of the base member and includes the plurality of wiring lines. The tail part includes a bent portion bent on a bottom surface periphery of the base member toward the bottom surface of the base member. The plurality of wiring lines extending through the bent portion are laid on an outer bent surface of the film sheet in the bent portion.

That is, according to this aspect of the present invention, the tail part extends in a manner so as to face the bottom surface of the base member. With the tail part facing the bottom surface of the base member, that is, with the tail part being tucked in, the sensor according to this aspect of the present invention is compact in size. Furthermore, according to this aspect of the present invention, the tail part includes the bent portion bent on the bottom surface periphery of the base member toward the bottom surface of the base member, and the plurality of wiring lines extending through the bent portion are laid on the outer bent surface of the film sheet in the bent portion. That is, the wiring lines extending through the bent portion may be laid on the outer bent surface of the film sheet (i.e., on an L-angle outer surface of the film sheet) such that the wiring lines are less prone to breakage. The reason for this is as follows. If the wiring lines are laid on an inner bent surface (i.e., on an L-angle inner surface of the film sheet), the wiring lines would be squeezed and crumpled on the bent portion and would be likely to peel from the film sheet accordingly. In contrast, the wiring lines laid on the outer bent surface of the bent portion are stretched on the film sheet; that is, the wiring lines are neither squeezed nor crumpled. This layout eliminates or reduces the possibility that the wiring lines will peel from the film sheet and will consequently break.

The plurality of wiring lines extending through the bent portion may be arranged side by side in a direction crossing a direction in which the tail part extends, and at least one of the plurality of wiring lines located in a bending contact site of the tail part in contact with at least the bottom surface periphery may be laid on the outer bent surface.

In the case that the wiring lines extending from the sensor electrodes are arranged side by side in the direction crossing the direction in which the tail part extends (e.g., the width direction of the tail part in an embodiment as will be described below), the wiring lines in the bending contact site of the bent portion in contact with the bottom surface periphery of the base member are particularly likely to break due to the bending of the film sheet. According to the aforementioned aspect of the present invention, at least one of the plurality of wiring lines located in the midsection of the tail part is laid on the outer bent surface. This layout reduces the possibility of breakage of the wiring lines in the midsection.

The bent portion may be bent along the bottom surface periphery in a manner so as to be in contact with the bottom surface periphery.

That is, according to an aspect of the present invention, the sensor is bent along the bottom surface periphery of the base member in a manner so as to be in contact with the bottom surface periphery. Thus, the tail part is disposed close to the bottom surface of the base member. With the tail part being tucked in, the sensor as a whole is compact in size.

The base member and the detection part may constitute a sensor main body section. The sensor main body section may be a three-dimensional figure including a top surface portion and a side surface portion.

That is, according to an aspect of the present invention, the sensor main body section is a three-dimensional figure including the top surface portion and the side surface portion such that well thought-out shapes of these portions translate into an improvement in the design of the sensor itself. The top surface portion of the sensor main body section may, for example, be a flat surface or a curved surface. The side surface portion of the sensor main body section may, for example, be an outer circumferential surface of a cylindrical column or of a polygonal prism.

The base member on at least a side on which the bent portion of the tail part is disposed may be in the form of a flat plate, and the bottom surface periphery may be a peripheral portion of the bottom surface of the base member.

That is, according to an aspect of the present invention, the base member on at least the side on which the bent portion of the tail part is disposed is in the form of a flat plate, and the bottom surface periphery is the peripheral portion of the bottom surface of the base member. As in the aspects above, the possibility that the wiring lines will break due to the bending of the tail part extending from the detection part is reduced accordingly.

At least a portion being part of the bottom surface periphery and facing the bent portion may be arc-shaped.

That is, according to an aspect of the present invention, the base member is shaped in such a manner that the bottom surface periphery of the base member is arc-shaped. This feature provides additional degrees of flexibility in the design of the three-dimensional shape of the sensor. Thus, the shape of the base member may be varied, with the possibility of breakage of the wiring lines on the bottom surface periphery being reduced.

According to an aspect of the present invention, the sensor may include a resist layer with which the plurality of sensor electrodes and the plurality of wiring lines are overlaid.

This aspect of the present invention offers an advantage in that the sensor electrodes and the wiring lines are securely protected by the resist layer. Another advantage of this aspect of the present invention is that the sensor electrodes are reliably insulated from each other.

According to an aspect of the present invention, the plurality of sensor electrodes are designed for a capacitive sensor that detects a change in capacitance.

That is, according to this aspect of the present invention, the sensor according to any one of the aforementioned aspects of the present invention, characterized as described above, is a capacitive sensor.

The sensor electrodes may be laid on a top surface or a back surface of the film sheet. Alternatively, the sensor electrodes may be laid on both the top surface and the back surface of the film sheet. Thus, various layouts of the sensor electrodes are rendered possible by this aspect of the present invention, which may be implemented as various sensors and various capacitive sensors accordingly.

The detection part and the base member may be a one-piece molded body. That is, according to an aspect of the present invention, the base member and the detection part are provided as a one-piece member. The detection part may thus be shaped in conformance with the design and shape of the base member. The sensor and the capacitive sensor are available in variety of designs accordingly.

According to an aspect of the present invention, the sensor may include a circuit board provided with a connector facing the bottom surface of the base member. With the connector and the circuit board being disposed close to the bottom surface of the base member, the sensor and the capacitive sensor each including the connector and the circuit board are compact in size.

According to an aspect of the present invention, the base member may include a top surface portion and a side surface portion that is tubular, and the tail part may extend to the inner side of the side surface portion. With the tail part being placed in a tubular space defined on the inner side of the base member, the sensor and the capacitive sensor are compact in size.

Advantageous Effects of Invention

The sensor according to an aspect of the present invention reduces the possibility that the wiring lines will break due to the bending of the tail part extending from the detection part.

BRIEF DESCRIPTION OF DRAWINGS

FIG. 1 illustrates a capacitive sensor according to a first embodiment.

FIG. 5 illustrates a capacitive sensor that is a modification of the first embodiment.

FIG. 6 illustrates a capacitive sensor according to a second embodiment.

FIG. 7 illustrates a capacitive sensor in Comparative Example 1.

FIG. 8 illustrates a capacitive sensor in Comparative Example 2.

FIG. 9 schematically illustrates the configuration of a capacitive sensor according to a third embodiment.

FIG. 10 schematically illustrates the configuration of a capacitive sensor according to a modification of the third embodiment.

DESCRIPTION OF EMBODIMENTS

Figure 1A:
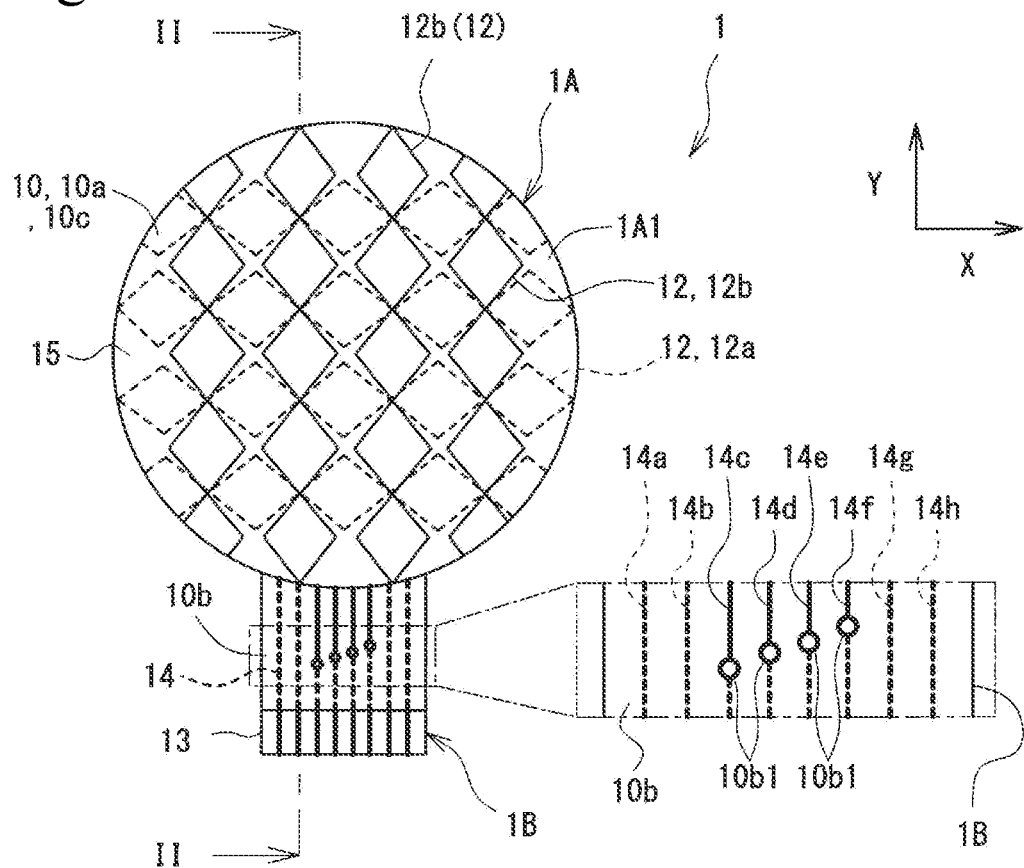
FIGS. 1A and 1B are a schematic plan view and a schematic front view, respectively, of the capacitive sensor.
Figure 1B:
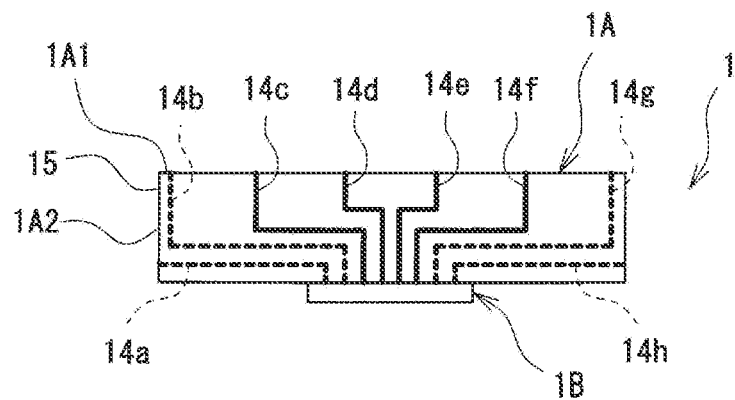

Hereinafter, an aspect of the present invention will be described in more detail by way of embodiments. To give a specific example of a sensor according to an aspect of the present invention, the following describes a capacitive sensor. Each element in the present embodiment and the corresponding element in each of the subsequent embodiments are denoted by the same reference sign, and redundant description thereof will be omitted. Similarly, redundant description of features such materials, actions, and effects that are common to the following embodiments will be omitted.

First Embodiment (FIGS. 1 to 4)

A capacitive sensor 1 according to the present embodiment includes a sensor sheet 10 and a base member 20.

The sensor sheet 10 includes a detection part 10a and a tail part 10b. The detection part 10a is fixedly stacked on a top surface portion 20a and a side surface portion 20b of the base member 20. The detection part 10a and the base member 20 constitute a sensor main body section 1A. The tail part 10b is a wiring connection section 1B, which extends from the sensor main body section 1A and provides connection and electrical continuity between the sensor main body section 1A and a connector 31 of a circuit board 30 (connection target).

The sensor sheet 10 includes a film sheet 11, which is a resin film. The film sheet 11 includes sensor electrodes 12, a terminal portion 13, and wiring lines 14 (14a to 14h). The sensor electrodes 12 are stacked in layers. The sensor sheet 10 includes a resist layer 15, which is the uppermost surface of the sensor sheet 10 except for the terminal portion 13 and protects the sensor electrodes 12 and the wiring lines 14. The sensor electrodes 12, the terminal portion 13, the wiring lines 14, and the resist layer 15 are printed layers of the film sheet 11.

As illustrated in FIG. 1A, the sensor electrodes 12 are each rhomboid in shape. The sensor electrodes 12 constitute circuit patterns (a first circuit pattern 12a and a second circuit pattern 12b) of the capacitive sensor 1. Referring to FIG. 1A, the lateral direction coincides with the direction of the X axis, and the vertical direction coincides with the direction of the Y axis. The first circuit pattern 12a is constituted of sensor electrodes 12 aligned in the lateral direction (i.e., along the X axis) in FIG. 1A in such a manner that a vertex on one diagonal line longer than the other diagonal line of a sensor electrode coincides with a vertex on one diagonal line longer than the other diagonal line of another sensor electrode. Circuit patterns extending along the X axis are arranged side by side and cross the Y axis to constitute the first circuit pattern 12a, which in turn enables the capacitive sensor to determine the y coordinate on the detection part 10a. The second circuit pattern 12b is constituted of sensor electrodes 12 aligned in the vertical direction (i.e., along the Y axis) in FIG. 1A in such a manner that a vertex on one diagonal line longer than the other diagonal line of a sensor electrode coincides with a vertex on one diagonal line longer than the other diagonal line of another sensor electrode. Circuit patterns extending along the Y axis are arranged side by side and cross the X axis to constitute the second circuit pattern 12b, which in turn enables the capacitive sensor to determine the x coordinate on the detection part 10a. Capacitive changes measured by the first circuit pattern 12a and capacitive changes measured by the second circuit pattern 12b are combined to determine the X and Y coordinates of touch operation.

Figure 2:
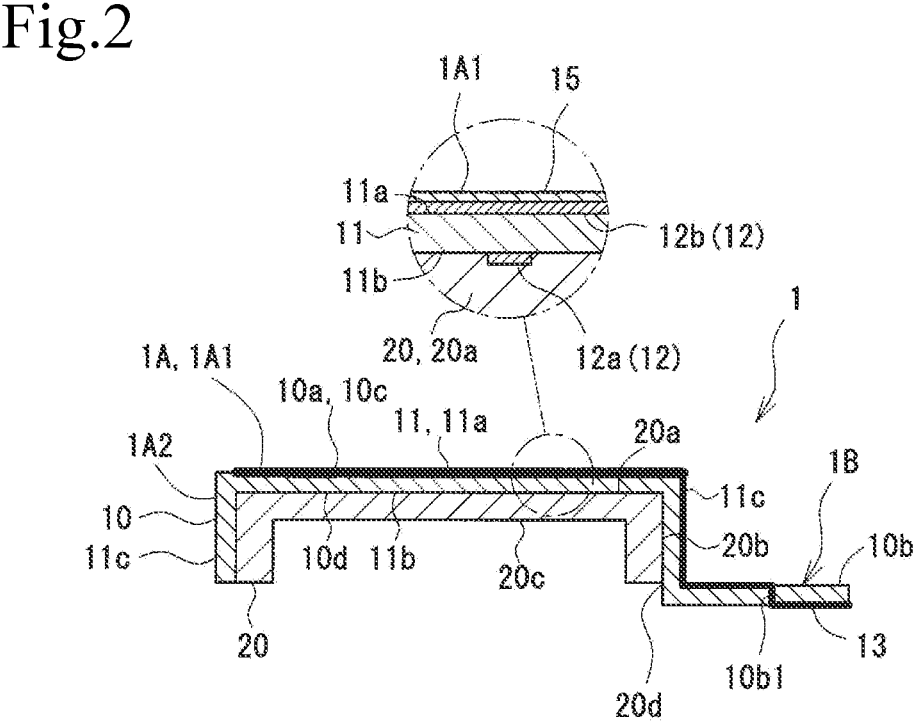
FIG. 2 is a sectional view of the sensor taken along line II-II in FIG. 1A.

Referring to the partially enlarged view in FIG. 2, the first circuit pattern 12a is provided on a back surface 11b of the film sheet 11, and the second circuit pattern 12b is provided on a top surface 11a of the film sheet 11. When viewed in plan, the first circuit pattern 12a and the second circuit pattern 12b are arranged in such a manner that, in the thickness direction of the film sheet 11, vertexes of the rhomboid shapes of the sensor electrodes 12 constituting the first circuit pattern 12a coincide with the vertexes of rhomboid shapes of the sensor electrodes 12 constituting the second circuit pattern 12b. In the thickness direction of the film sheet 11, the rhomboid shapes of the sensor electrodes 12 constituting the first circuit pattern 12a do not overlap the rhomboid shapes of the sensor electrodes 12 constituting the second circuit pattern 12b. The sensor electrodes 12 constituting the first circuit pattern 12a and the sensor electrodes 12 constituting the second circuit pattern 12b are arranged in a grid pattern to provide operation coordinates for determining the x and y coordinates of touch operation.

A top surface 10c of the sensor sheet 10, that is, a top surface of the resist layer 15 is an operation screen on which touch operation is performed. The detection part 10a of the sensor sheet 10 is stacked on the base member 20, with a back surface 10d of the detection part 10a being fixed to the base member 20. That is, the sensor sheet 10 and the base member 20 are provided in one-piece construction. The one-piece construction enables the detection part 10a to be shaped in conformance with the outer surface of the base member 20. The film sheet 11, which is a material in the form of a flat film, may be shaped in conformance with the outer surface of the base member 20, thus providing a three-dimensional, dome-shaped or arc-shaped operation screen. The sensor sheet 10 covers not only the top surface portion 20a of the base member 20 but also the side surface portion 20b, which is tubular in shape. That is, the sensor sheet 10 has a corner portion extending from the top surface portion 20a to the side surface portion 20b of the base member 20, and the corner portion may be rounded. The back surface 10d of the detection part 10a of the sensor sheet 10 may be covered with a resist layer, which is fixedly stacked on the sensor sheet 10 and the base member 20.

The tail part 10b is not fixedly stacked on the base member 20 and extends from a bottom surface periphery 20d of the side surface portion 20b, which is part of the base member 20 and tubular in shape. The tail part 10b is a protrusion extending from the detection part 10a and includes the terminal portion 13, which is provided to a tip portion of the protrusion. The wiring lines 14 extend from the detection part 10a provided in the film sheet 11 of the sensor sheet 10. The wiring lines 14 are laid on a side surface 11c of the film sheet 11 and on the tail part 10b and extend to the terminal portion 13.

More specifically, the first circuit pattern 12a constituted of the sensor electrodes 12 is provided on the back surface 11b of the film sheet 11. The wiring lines 14 extending from the first circuit pattern 12a are laid on the back surface 11b of the film sheet 11 in a manner so as to extend from the first circuit pattern 12a to the terminal portion 13 of the tail part 10b.

The second circuit pattern 12b is provided on the top surface 11a of the film sheet 11. Between the second circuit pattern 12b and through-holes 10b1 of the tail part 10b, the wiring lines 14 extending from the second circuit pattern 12b are laid on the top surface 11a of the film sheet 11. The wiring lines 14 extend through the through-holes 10b1 to the back surface 11b of the film sheet 11 and are laid on the back surface 11b in a manner so as to extend to the terminal portion 13b.

In a region between the terminal portion 13b and the through holes 10b1, all of the wiring lines 14 are laid on the back surface 11b of the film sheet 11. In a region between the detection part 10a and the through-holes 10b1, the wiring lines 14c, 14d, 14e, and 14f, which are four wiring lines 14 located in the midsection in the width direction of the tail part 10b, are laid on the top surface 11a of the film sheet 11. The wiring lines 14a, 14b, 14g, and 14h in regions beside the midsection of the tail part 10b are laid on the back surface 11b of the film sheet 11. The reason for this is as follows.

Figure 3:
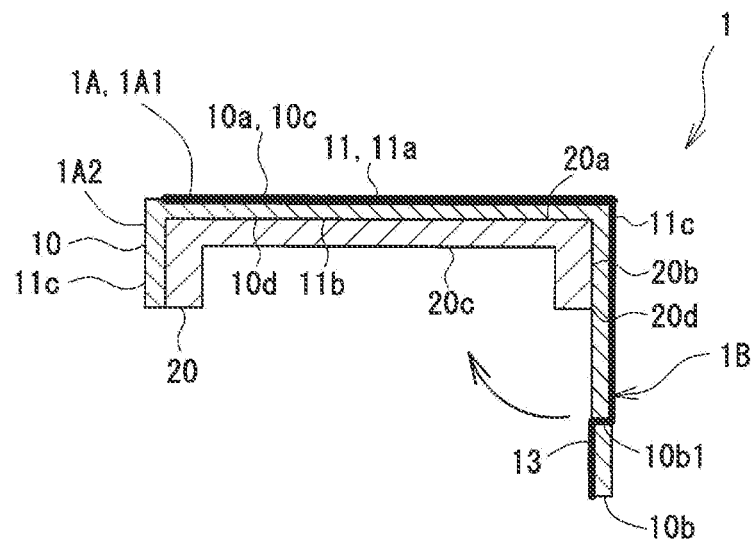
FIG. 3 is a sectional view corresponding to FIG. 2 and illustrates a state in which a tail part illustrated in FIG. 2 is bent.
Figure 4:
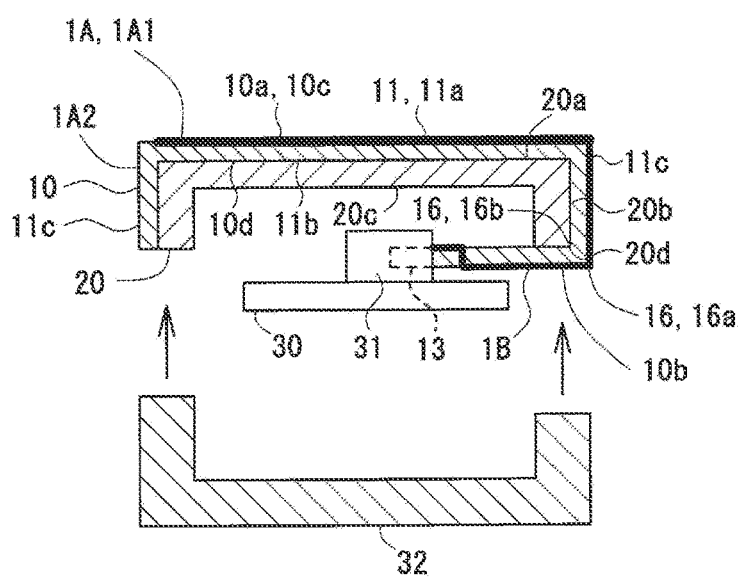
FIG. 4 is a sectional view corresponding to FIG. 2 and illustrates a state in which the tail part illustrated in FIG. 3 is bent in a manner so as to face a back surface of a base member.

The capacitive sensor 1 is obtained by integrally molding the sensor sheet 10 and the base member 20, with the sensor electrodes 12, the terminal portion 13, and the wiring lines 14 being provided on the sensor sheet 10. FIG. 2 illustrates a one-piece molded body obtained by integrally molding the sensor sheet 10 and the base member 20. The one-piece molded body includes the sensor main body section 1A and the wiring connection section 1B extending on one lateral side of the sensor main body section 1A. As illustrated in FIG. 3, the wiring connection section 1B (i.e., the tail part 10b) is bent downward along the side surface portion 20b of the base member 20. As illustrated in FIG. 4, the wiring connection section 1B (i.e., the tail part 10b) is then bent toward a bottom surface portion 20c of the base member 20, and a bent portion 16 is consequently formed in the angled section (close to a distal end of the tail part 10b). The wiring connection section 1B (i.e., the tail part 10b) is bent toward the bottom surface portion 20c of the base member 20 for the purpose of connecting the terminal portion 13 to the connector 31, which faces the bottom surface portion 20c.

During a transition from the state in FIG. 3 to the state in FIG. 4, the bent portion 16 is formed by bending the wiring connection section 1B (i.e., the tail part 10b); or more specifically, the wiring connection section 1B (i.e., the tail part 10b) is bent along the bottom surface periphery 20d of the bottom surface portion 20c of the base member 20. The proximal end portion of the wiring connection section 1B (i.e., the tail part 10b) and the bottom surface periphery 20d come into contact with each other at a bending point of the bent portion 16. The bent portion 16 extends throughout the entire width of the wiring connection section 1B (i.e., the tail part 10b).

A bending contact site of the bent portion 16 (i.e., an inner bent surface 16b of the bent portion 16) is in contact with the bottom surface periphery 20d and is the bending point of the bent portion 16. The bending contact site is bent in such a way as to be shaped in conformance with the outer shape of the bottom surface periphery 20d. This means that great stress is exerted on the bending contact site. If the wiring lines 14 are laid on the bending contact site on the back surface 11b of the film sheet 11, the conductive printed layer provided as the wiring lines 14 would be squeezed and crumpled on an L-angle inner surface of the bent portion 16 and would consequently peel from the back surface 11b of the film sheet 11, thus being prone to breakage.

As a workaround, the wiring lines 14 are laid on an outer bent surface 16a of the bent portion 16 in a manner so as not to face the bottom surface periphery 20d; that is, the wiring lines 14 are laid on the top surface 11a of the film sheet 11. In this case, the printed layer provided as the wiring lines 14 is stretched along an L-angle outer surface of the bent portion 16. The stretch itself will not cause breakage of the printed layer. That is, on the bent portion 16, the wiring lines 14 are laid on the outer bent surface 16a (i.e., on the top surface 11a of the film sheet 11) opposite the back surface 11b for the purpose of eliminating or reducing the possibility of breakage of the wiring lines 14. This contrasts with the situation in which the wiring lines 14 are laid on the inner bent surface 16b (i.e., on the back surface 11b of the film sheet 11) facing the bottom surface periphery 20d and are thus more prone to breakage.

The bent portion 16 in the present embodiment is designed in such a manner that the bending contact site in contact with the bottom surface periphery 20d coincides with the midsection in the width direction of the wiring connection section 1B (i.e., the tail part 10b). For this reason, the wiring lines 14 in the present embodiment are laid as follows. The wiring lines 14c, 14d, 14e, and 14f, which are four wiring lines located in the midsection in the width direction of the tail part 10b, are laid on the outer bent surface 16a of the bent portion 16 and extend through the through-holes 10b1 of the tail part 10b to the back surface 11b of the film sheet 11 and further to the terminal portion 13. The wiring lines 14a, 14b, 14g, and 14h in the regions beside the midsection of the tail part 10b are not bent along the bottom surface periphery 20d and are thus less prone to breakage than the wiring lines located in the midsection of the tail part 10b. This is the reason why the wiring lines 14a, 14b, 14g, and 14h are laid on the inner bent surface 16b of the bent portion 16. In the case that the base member 20 is a three-dimensional figure including a tubular side surface portion, the bottom surface periphery 20d of the base member 20 is, for example, an arc-shaped curve when viewed in plan. The tail part 10b extending on one lateral side of the base member 20 is bent in such a way as to be creased along the bottom surface periphery 20d. The crease formed by the bending is substantially straight. The midsection in the width direction of the tail part 1b is in contact with the bottom surface periphery 20d, whereas the tail part 1b in the regions beside the midsection are bent without direct contact with the bottom surface periphery 20d.

The following describes an example in which the bottom surface periphery 20d in contact with the bent portion 16 is in the form of an arc when viewed in plan. In the case that the radius of the arc is less than 30 mm, the midsection of the tail part 10b is about 7 mm in width, and the wiring lines 14 located in the midsection are preferably laid on the top surface 11a of the film sheet 11, that is, on the L-angle outer surface of the bent portion 16. In the case that the radius of the arc is equal or more than 30 mm and less than 60 mm, the midsection of the tail part 10b is about 9 mm in width, and the wiring lines 14 located in the midsection are preferably laid on the top surface 11a of the film sheet 11, that is, on the L-angle outer surface of the bent portion 16. In the case that the radius of the arc is equal to or more than 60 mm and less than 90 mm, the midsection of the tail part 10b is about 12 mm in width, and the wiring lines 14 located in the midsection are preferably laid on the top surface 11a of the film sheet 11, that is, on the L-angle outer surface of the bent portion 16.

As the radius of the base member 20 increases, the arc shape of the bottom surface periphery 20d becomes more linear, which results in an increase in the area of the midsection of the bent portion 16 of the tail part 10b, that is, an increase in the area of a contact region that is in contact with the bottom surface periphery 20d. The wiring lines 14 located in the contact region are laid on the top surface 11a of the film sheet 11.

The following describes details such as materials and functions of the constituent elements of the capacitive sensor 1.

The film sheet 11, which is a member of the sensor sheet 10, is a resin film made of thermoplastic resin. The thermoplastic resin is selected because of its moldability; more specifically, the thermoplastic resin may be easily shaped in conformance with the base member 20 by the application of heat. Examples of the material of the resin film to be used include polyethylene terephthalate (PET) resin, polyethylene naphthalate (PEN) resin, polycarbonate (PC) resin, polymethyl methacrylate (PMMA) resin, polypropylene (PP) resin, polyurethane (PU) resin, polyamide (PA) resin, polyethersulfone (PES) resin, polyetherketone (PEEK) resin, triacetylcellulose (TAC) resin, polyimide (PI) resin, and cycloolefin polymers (COP). A transparent resin film is preferably used in the case that the back surface 10d of the sensor sheet 10 includes a display portion (not illustrated) on which a mark of some kind, such as symbols or numbers, is placed.

The film sheet 11 is required to have shape stability for keeping its shape and to be flexible enough to withstand bending. Thus, the film sheet 11 preferably has a thickness of 10 to 500 The film sheet 11 may be overlaid with a primer layer, a surface protection layer, or an overcoat layer. The primer layer enhances the adhesion between the film sheet 11 and a conductive polymer that is the material of the sensor electrodes 12. The material of the sensor electrodes 12 will be described below. The overcoat layer may, for example, prevent the film sheet 11 from being electrically charged. Alternatively, the film sheet 11 may be surface-treated in advance.

The sensor electrodes 12 are in the form of a conductive layer made of a conductive ink or a conductive polymer. The use of a conductive polymer offers an advantage in that the sensor electrodes 12 stretched during integral molding of the sensor sheet and the base member 20 are less prone to breakage. The sensor electrodes 12 may be printed with a conductive polymer that is a coating fluid in liquid form. The sensor electrodes printed with the conductive polymer are more inexpensive than sensor electrodes made of ITO or the like. The conductive polymer is thus preferred as the material of the sensor electrodes 12. In the case that the sensor electrodes 12 do not need to be transparent, conductive ink such as silver ink or carbon paste may be used to form the sensor electrodes 12. The sensor electrodes made of silver ink are of low resistance and achieve high sensitivity. In this respect, the silver ink is preferred as the material of the sensor electrodes 12. The sensor electrodes made of carbon paste are more inexpensive than sensor electrodes made of a conductive polymer and has good weatherability. In these respects, carbon paste is preferred as the material of the sensor electrodes 12.

Conductive polymers capable of being formed into a transparent layer may be used as the material of the sensor electrodes 12. Examples of such a transparent conductive polymer include poly(p-phenylene), polyacetylene, and poly (3,4-ethylenedioxythiophene)-poly(styrenesulfonate) (PEDOT-PSS). The layer provided as the sensor electrode 12 preferably has a thickness of 0.04 to 1.0 μm and more preferably has a thickness of 0.06 to 0.4 In the case that the thickness of the layer is less than 0.04 μm, the resistance value of the sensor electrodes 12 will be high. In the case that the thickness of the layer is more than 1.0 μm, the degree of transparency of the sensor electrodes 12 will be low. The sensor electrodes 12 provided on the film sheet 11 may be examined under an atomic force microscope (AFM) to determine the thickness of the sensor electrodes 12.

The wiring lines 14 provide connection and electrical continuity between each sensor electrode 12 and the terminal portion 13. The wiring lines 14 are preferably made of conductive paste or conductive ink containing highly conductive metal, such as copper, aluminum, silver, or an alloy of these metals. Among these metals and alloys of these metals, silver in particular is highly conductive. Furthermore, silver is more resistant to oxidation than copper. For these reasons, the wiring lines 14 are preferably made of silver.

The wiring lines 14 each preferably has a thickness of 1.0 to 20 In the case that the thickness of each wiring line 14 is less than 1.0 the resistance value of the wiring lines 14 is likely to increase, which can cause noise. In the case that the thickness of each wiring line 14 is more than 20 the resultant level difference is great, and air bubbles are thus likely to be formed when the wiring lines 14 are overlaid with the resist layer 15. The trapped air bubbles burst and become voids, which can lead to corrosion of the highly conductive metal in the wiring lines 14. The resistance value of the wiring lines 14 is preferably equal to or less than 300Ω. In the case that the resistance value of the wiring lines 14 is more than 300Ω, the noise level can be high, which will cause the sensor to go down in sensitivity.

The terminal portion 13 is a connection portion for connecting the capacitive sensor 1 to the connector 31 of the circuit board 30 for conduction of electricity. The terminal portion 13 may be formed by coating the tips of the wiring lines 14 with carbon ink.

The resist layer 15 is an insulating protective film that is provided to prevent electrical continuity between the adjacent sensor electrodes 12 and to keep the sensor electrodes 12 from ultraviolet rays and from getting scratched. The resist layer 15 is transparent. The resist layer 15 also has the function of preventing corrosion of the wiring lines 14 made of silver paste or metal. The resist layer 15 is made of rigid resin. The rigid resin selected as the material of the resist layer 15 may be acrylic resin, urethane resin, epoxy resin, polyolefin resin, or a resin other than these resins. The resist layer 15 typically has a thickness of 6 to 30 μm and preferably has a thickness of 10 to 20 μm. In the case that the thickness of the resist layer 15 is more than 30 μm, the resist layer 15 is poorly flexible. In the case that the thickness of the resist layer 15 is less than 6 μm, the resist layer 15 will fail to sufficiently protect the sensor electrodes 12.

The following describes actions and effects caused by the capacitive sensor 1 according to the present embodiment. The actions and effects mentioned above will not be further elaborated here.

The capacitive sensor 1 reduces the possibility that the wiring lines 14 will break when the sensor main body section 1A, the wiring connection section 1B extending from the detection part 10a, and the tail part 10b are bent along the bottom surface periphery 20d of the base member 20.

The capacitive sensor 1 is bent along the bottom surface periphery 20d of the base member 20 in a manner so as to be in contact with the bottom surface periphery 20d. The tail part 10b may thus be disposed close to the bottom surface portion 20c of the base member 20. With the tail part 10b being tucked in, the capacitive sensor 1 as a whole is compact in size.

The tail part 10b extends in a manner so as to face the bottom surface portion 20c of the base member 20. The capacitive sensor 1 with the tail part 10b disposed therein is thus compact in size. This enables a reduction in the size of an electric apparatus in which the capacitive sensor 1 is incorporated.

The base member 20 may be a first split casing of the electronic apparatus. The base member 20 has an opening 20e, where the base member 20 may be combined with a second split casing 32. The first split casing (i.e., the base member 20) and the second split casing 32 constitute a casing in which a housing space is defined. The circuit board 30 may be placed in the housing space. The terminal portion 13 of the tail part 10b may be connected to the connector 31 within the casing.

The sensor main body section 1A is a three-dimensional figure including a top surface portion 1A1 and a side surface portion 1A2 such that well thought-out shapes of these portions translate into an improvement in the design of the capacitive sensor 1 itself. The top surface portion 1A1 of the sensor main body section 1A is an operation screen and may, for example, be a flat surface or a curved surface. The side surface portion 1A2 may, for example, be an outer circumferential surface of a cylindrical column or of a polygonal prism.

The sensor electrodes 12 and the wiring lines 14 are securely protected by the resist layer 15. The sensor electrodes 12 are reliably insulated from each other by the resist layer 15.

Figure 5A:
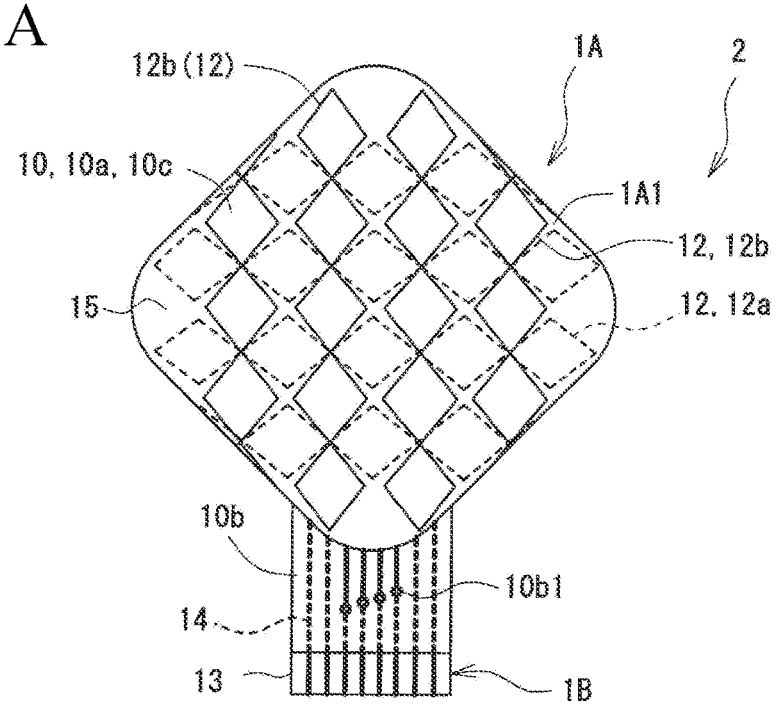
FIGS. 5A and 5B are a schematic plan view and a schematic front view, respectively, of the capacitive sensor.
Figure 5B:
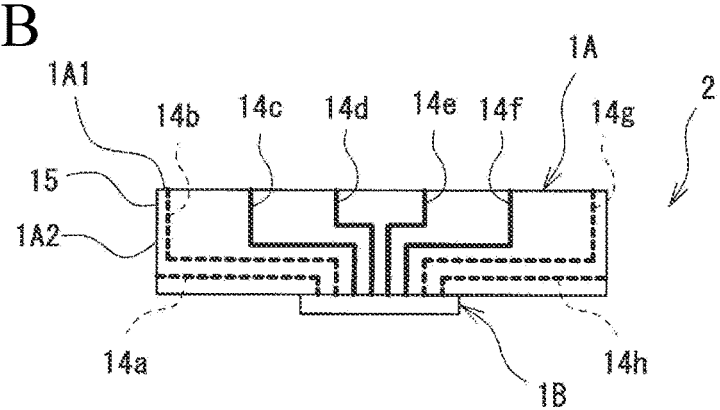

Modification of First Embodiment (FIG. 5)

FIG. 5 includes a schematic plan view and a schematic front view of a capacitive sensor 2, which is a modification of the first embodiment. The capacitive sensor 2 differs from the capacitive sensor 1 in that the top surface portion 20a of the base member 20 is polygonal when viewed in plan. When viewed in plan, the tail part 10b of the capacitive sensor 2 extends out from one of rounded corners where two sides of the capacitive sensor 2 meet. The capacitive sensor 2 is otherwise identical to the capacitive sensor 1.

Figure 6A:
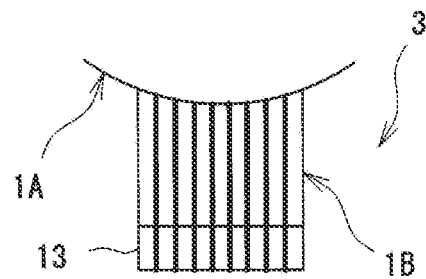
FIG. 6A is a schematic plan view of a tail part of the capacitive sensor.
Figure 6B:
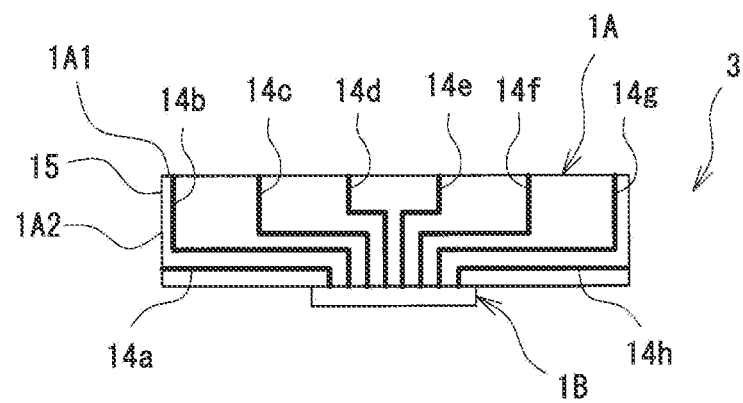
FIG. 6B is a schematic front view of the capacitive sensor.
Figure 6C:
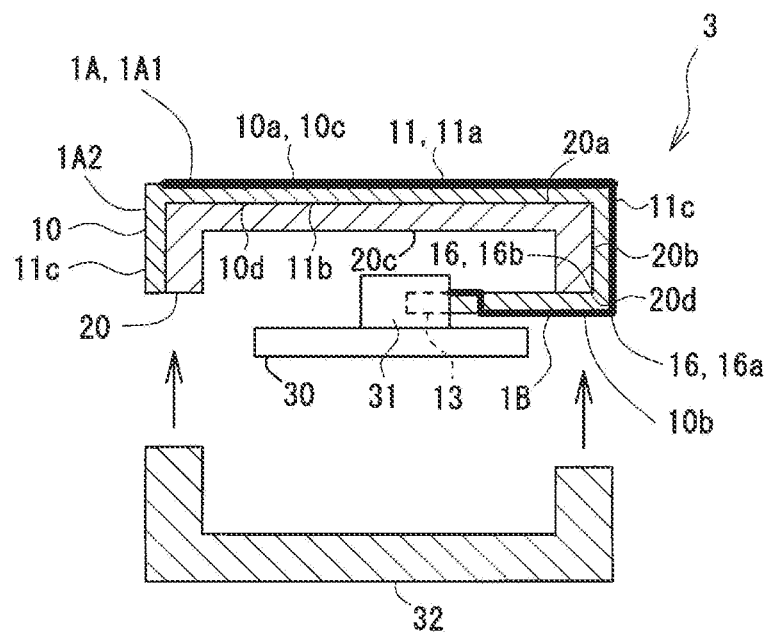
FIG. 6C is a sectional view corresponding to FIG. 2.

Second Embodiment (FIG. 6)

FIG. 6 illustrates a capacitive sensor 3 according to a second embodiment. The capacitive sensor 3 differs from the capacitive sensor according to the first embodiment in that the first circuit pattern 12a and the second circuit pattern 12b are laid on the top surface 11a of the film sheet 11. The first circuit pattern 12a and the second circuit pattern 12b are insulated from each other by a resist (not illustrated) provided at intersections of the two circuit patterns. The resist and the resist layer 15 may be made of the same material. The first circuit pattern 12a may be overlaid with the resist layer 15, which entirely covers a top surface of the first circuit pattern 12a. Then, the second circuit pattern 12b may be laid on a top surface of the resist layer 15. The second circuit pattern 12b may be overlaid with another resist layer 15; that is, two resist layers 15 may be provided.

On both the side surface portion 1A2 of the sensor main body section 1A and the wiring connection section 1B, the wiring lines 14 are laid on the top surface 11a of the film sheet 11. This layout prevents the possibility that the wiring lines 14 will break due to the bending of the tail part 10b. All of the wiring lines 14 are laid on the top surface 11a of the film sheet 11, thus eliminating the need for the through-holes 10b1. This layout is simplicity itself.

Figure 7A:
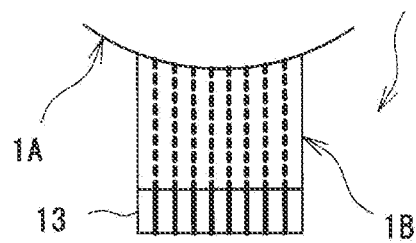
FIG. 7A is a schematic plan view of a tail part of the capacitive sensor.
Figure 7B:
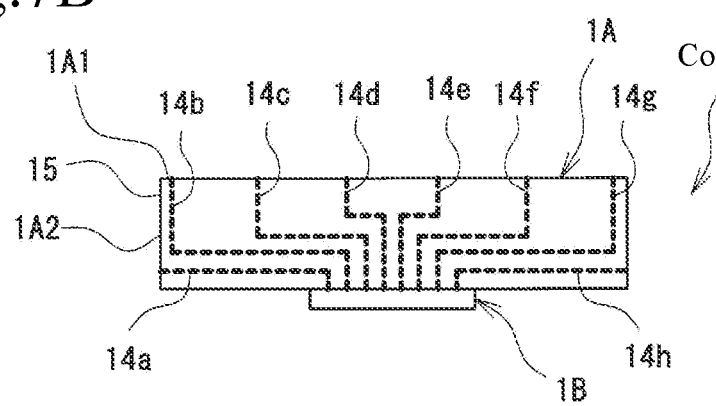
FIG. 7B is a schematic front view of the capacitive sensor.
Figure 7C:
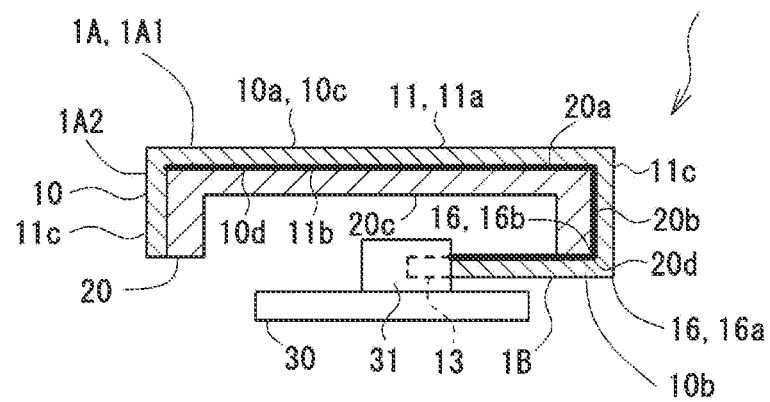
FIG. 7C is a sectional view corresponding to FIG. 2.

Comparative Example (FIG. 7)

FIG. 7 illustrates a capacitive sensor in a first comparative example (Comparative Example 1), in which, unlike the wiring lines in the embodiments above, the wiring lines 14 are prone to breakage. When being bent toward the bottom surface portion 20c of the base member 20, the tail part 10b comes into contact with the bottom surface periphery 20d of the base member 20. In this contact site, all of the wiring lines 14 of the capacitive sensor in Comparative Example 1 are laid on the back surface 11b of the film sheet 11. The wiring lines 14 of the capacitive sensor in Capacitive Example 1 are likely to break when the tail part 10b is bent toward the bottom surface portion 20c of the base member 20. The wiring lines 14 are laid on an L-angle inner surface of the bent portion. When the tail part 10b is bent, the wiring lines 14 are squeezed and crumpled on the L-angle inner surface and are thus likely to peel from the back surface 11b of the film sheet 11. This is the reason why the wiring lines 14 are prone to breakage.

Figure 8A:
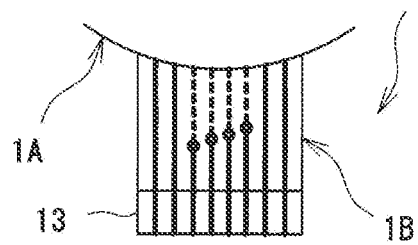
FIG. 8A is a schematic plan view of a tail part of the capacitive sensor.
Figure 8B:
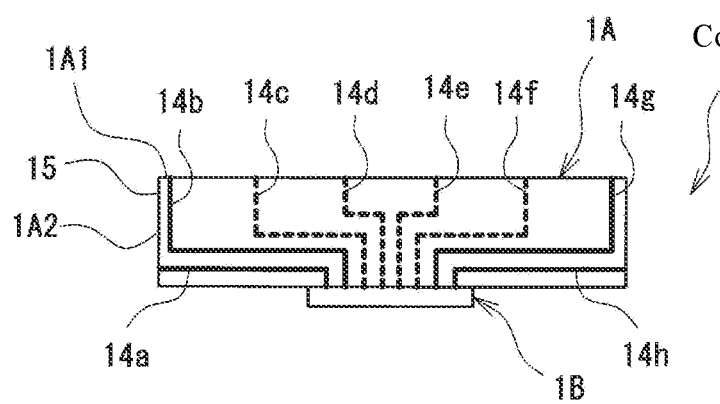
FIG. 8B is a schematic front view of the capacitive sensor.
Figure 8C:
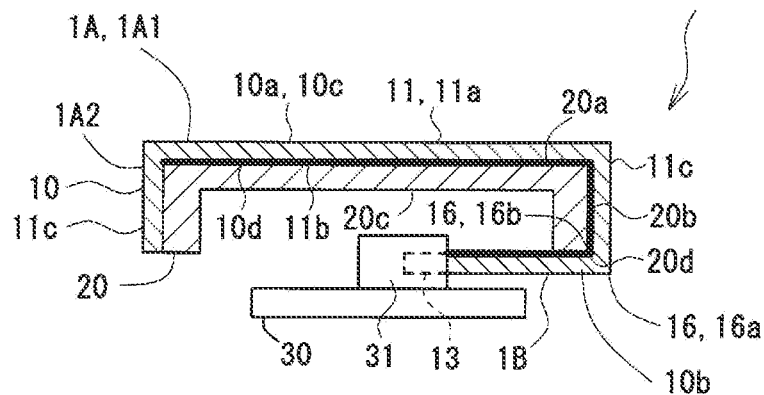
FIG. 8C is a sectional view corresponding to FIG. 2.

Comparative Example (FIG. 8)

FIG. 8 illustrates a capacitive sensor in a second comparative example, in which the wiring lines 14 are prone to breakage. When being bent toward the bottom surface portion 20c of the base member 20, the tail part 10b comes into contact with the bottom surface periphery 20d of the base member 20. In this contact site, some of the wiring lines 14 of the capacitive sensor in Comparative Example 2, or more specifically, the wiring lines 14 in the midsection in the width direction of the tail part 10b are laid on the back surface 11b of the film sheet 11. The wiring lines 14 in the midsection are crushed in the bent portion. If the tail part 10b is unfolded and is then bent again, the conductive printed layer provided as the wiring lines 14 would cleave and peel off from the film sheet 11. This would result in the breakage of the wiring lines 14.

Third Embodiment (FIG. 9)

Figure 9A:
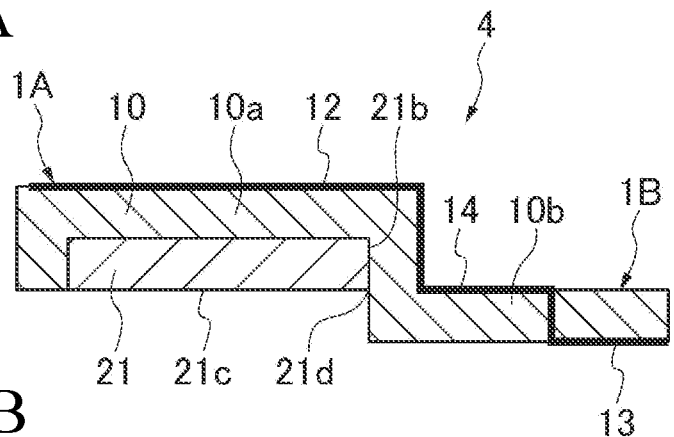
FIG. 9A is a sectional view of the capacitive sensor, illustrating a state in which a tail part of the capacitive sensor is yet to be bent.

FIG. 9 schematically illustrates the configuration of a capacitive sensor 4 according to a third embodiment. FIG. 9A is similar to FIG. 2, which is a sectional view taken along line II-II in FIG. 1A; that is, FIG. 9A is a sectional view taken along a line extending in the longitudinal direction from an end of the sensor main body section 1A to the terminal portion 13 of the wiring connection section 1B of the capacitive sensor 4 according to the third embodiment.

The base member 20 of the capacitive sensor according to the first embodiment is a three-dimensional figure, whereas a base member 21 of the capacitive sensor 4 according to the present embodiment is in the form of a flat plate. As illustrated in FIG. 9A, the base member 21 on at least the side on which the bent portion of the tail part 10b is disposed is in the form of a flat plate, and the bottom surface periphery, which is denoted by 21d in the present embodiment, is a peripheral portion of a bottom surface 21c of the base member 21. The capacitive sensor 4 according to the present embodiment is otherwise identical to the capacitive sensor 1 according to the first embodiment.

As with the base member in the first embodiment, the base member 21 in the present embodiment includes a top surface portion overlaid with the sensor sheet 10. The sensor sheet 10 includes the detection part 10a and the tail part 10b. The detection part 10a is fixedly stacked on the top surface portion of the base member 21. The detection part 10a and the base member 21 constitute the sensor main body section 1A. The tail part 10b is the wiring connection section 1B, which extends from the sensor main body section 1A and provides connection and electrical continuity between the sensor main body section 1A and the connector 31 (see FIG. 4) of the circuit board 30 (connection target) (see FIG. 4).

Figure 9B:
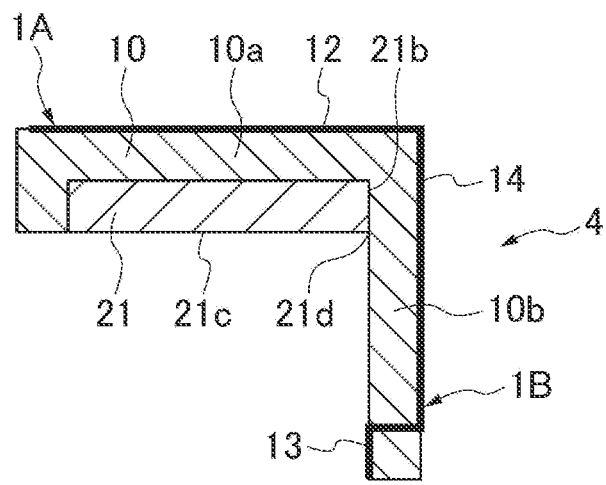
FIG. 9B is a sectional view corresponding to FIG. 9A and illustrates a state in which the tail part is bent.
Figure 9C:
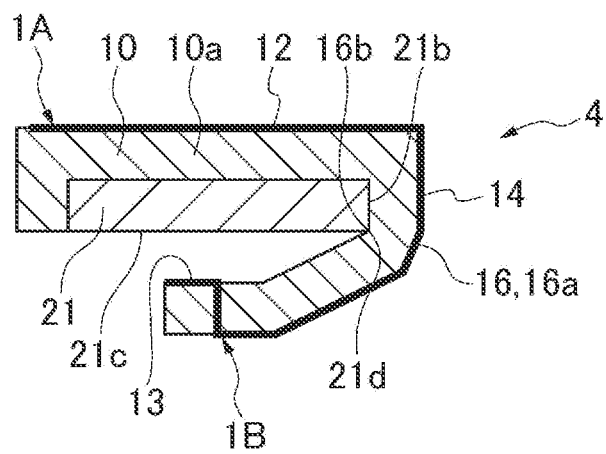
FIG. 9C is a sectional view corresponding to FIG. 9A and illustrates a state in which the tail part is bent in a manner so as to face a back surface of a base member.

The capacitive sensor 4 is a one-piece molded body obtained by integrally molding the sensor sheet 10 and the base member 21, with the sensor electrodes 12, the terminal portion 13, and the wiring lines 14 being provided on the sensor sheet 10. As illustrated in FIG. 9A, the one-piece molded body includes the sensor main body section 1A and the wiring connection section 1B extending on one lateral side of the sensor main body section 1A. As illustrated in FIG. 9B, the wiring connection section 1B (i.e., the tail part 10b) is bent downward along an end portion 21b of the base member 21. As illustrated in FIG. 9C, the wiring connection section 1B (i.e., the tail part 10b) is then bent toward the bottom surface portion 21c of the base member 21, and the bent portion 16 is consequently formed in the angled section (close to the distal end of the tail part 10b). The wiring connection section 1B (i.e., the tail part 10b) is bent toward the bottom surface portion 20c of the base member 21 for the purpose of connecting the terminal portion 13 to the connector 31, which faces the bottom surface portion 21c.

During a transition from the state in FIG. 9B to the state in FIG. 9C, the bent portion 16 is formed by bending the wiring connection section 1B (i.e., the tail part 10b); or more specifically, the wiring connection section 1B (i.e., the tail part 10b) is bent along the bottom surface periphery 21d of the bottom surface portion 21c of the base member 21. The proximal end portion of the wiring connection section 1B (i.e., the tail part 10b) and the bottom surface periphery 21d come into contact with each other at the bending point of the bent portion 16. The bent portion 16 extends throughout the entire width of the wiring connection section 1B (i.e., the tail part 10b).

The bending contact site of the bent portion 16 (i.e., the inner bent surface 16b of the bent portion 16) in contact with the bottom surface periphery 21d is the bending point of the bent portion 16. The bending contact site is bent in such a way as to be shaped in conformance with the outer shape of the bottom surface periphery 21d. This means that great stress is exerted on the bending contact site. If the wiring lines 14 are laid on the bending contact site on the back surface 11b of the film sheet 11, the conductive printed layer provided as the wiring lines 14 would be squeezed and crumpled on the L-angle inner surface of the bent portion 16 and would consequently peel from the back surface 11b of the film sheet 11, thus being prone to breakage.

As a workaround, the wiring lines 14 are laid on the outer bent surface 16a of the bent portion 16 in a manner so as not to face the bottom surface periphery 21d. In this case, the printed layer provided as the wiring lines 14 is stretched along the L-angle outer surface of the bent portion 16. The stretch itself will not cause breakage of the printed layer. That is, on the bent portion 16, the wiring lines 14 are laid on the outer bent surface 16a opposite the back surface 11b for the purpose of eliminating or reducing the possibility of breakage of the wiring lines 14. This contrasts with the situation in which the wiring lines 14 are laid on the inner bent surface 16b facing the bottom surface periphery 21d and are thus more prone to breakage. The base member 21 is in the form of a flat plate, and the peripheral portion of the bottom surface 21c of the base member 21 is the bottom surface periphery 21d. As with the embodiments above, the present embodiment reduces the possibility that the wiring lines 14 will break due to the bending of the tail part 10b. With the base member 21 being in the form of a flat plate, the capacitive sensor 4 according to the present embodiment is thin in profile.

Figure 10A:
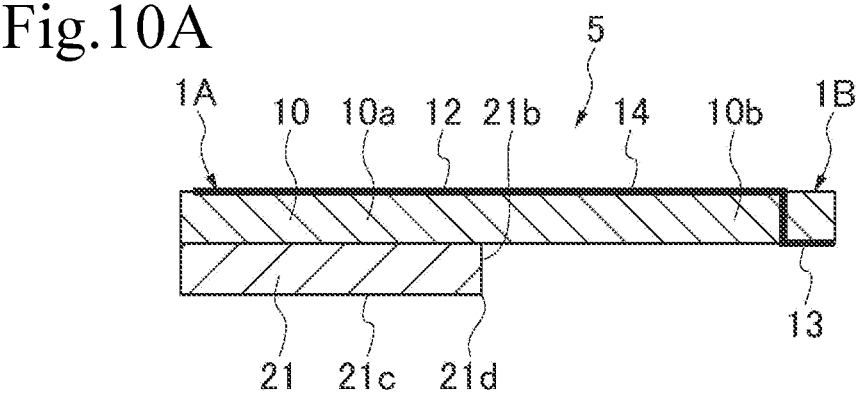
FIG. 10A is a sectional view of the capacitive sensor, illustrating a state in which a tail part of the capacitive sensor is yet to be bent.
Figure 10B:
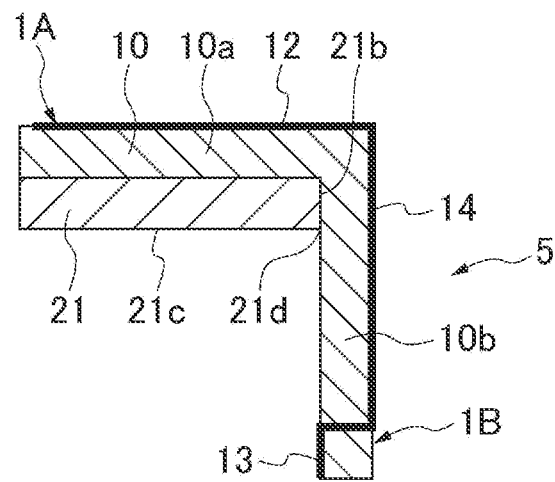
FIG. 10B is a sectional view corresponding to FIG. 10A and illustrates a state in which the tail part is bent.
Figure 10C:
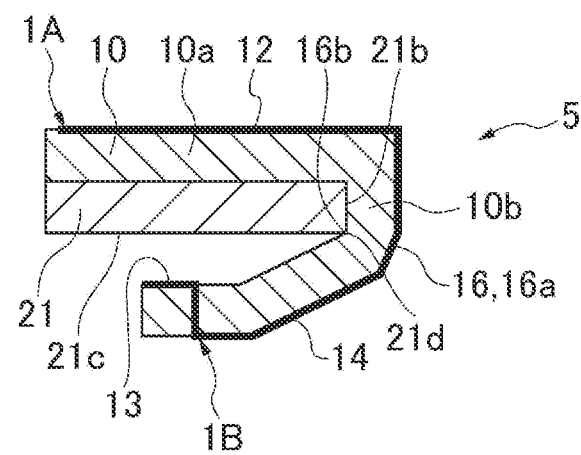
FIG. 10C is a sectional view corresponding to FIG. 10A and illustrates a state in which the tail part is bent in a manner so as to face a back surface of a base member.

Modification of Third Embodiment (FIG. 10)

FIG. 10 schematically illustrates the configuration of a capacitive sensor 5, which is a modification of the third embodiment. FIG. 10A is similar to FIG. 2, which is a sectional view taken along line II-II in FIG. 1A; that is, FIG. 10A is a sectional view taken along a line extending in the longitudinal direction from an end of the sensor main body section 1A to the terminal portion 13 of the wiring connection section 1B of the capacitive sensor 5 in this modification of the third embodiment.

As illustrated in FIG. 10A, the capacitive sensor 5 according to this modification differs from the capacitive sensor according to the third embodiment in that an end of the sensor sheet 10 on the top surface portion of the base member 21 in the form of a flat plate is in line with an end of the base member 21. The capacitive sensor in this modification is otherwise identical to the capacitive sensor 4 according to the third embodiment. As illustrated in FIG. 10A, the base member 21 on at least the side on which the bent portion of the tail part 10b is disposed is in the form of a flat plate, and the bottom surface periphery 21d is the peripheral portion of the bottom surface 21c of the base member 21. The capacitive sensor in this modification is otherwise identical to the capacitive sensor 1 according to the first embodiment.

The base member 21 is in the form of a flat plate, and the peripheral portion of the bottom surface 21c of the base member 21 is the bottom surface periphery 21d. The end of the sensor sheet 10 is in line with the corresponding end of the base member 21. As with the embodiments above, this modification reduces the possibility that the wiring lines 14 will break due to the bending of the tail part 10b. With the base member 21 being in the form of a flat plate, the capacitive sensor 5 in this modification is thin in profile.

Although the base member 21 of the capacitive sensor 4 according to the third embodiment and the base member 21 of the capacitive sensor 5 according to the aforementioned modification of the third embodiment are each entirely in the form of a flat plate, it is only required that the base member 21 on at least the side on which bent portion of the tail part 10b is disposed be in the form of a flat plate. Except for the portion in the form of a flat plate on the side on which the bent portion of the tail part 10b is disposed, the base member 21 may have projections and recesses.

The embodiments above are examples of the present invention. These embodiments may, for example, be modified or may implemented with well-known techniques or in various combinations within a range not departing from the spirit of the present invention, and the resultant techniques fall within the scope of the present invention. For example, the wiring lines 14 in the regions beside the midsection of the tail part 10*b* may be laid on the top surface 11*a* or the back surface 11*b* of the film sheet 11.

The capacitive sensors 1, 2, 3, 4, and 5 according to the respective embodiments may each include a decorative layer that includes a display portion colored or marked with letters, numbers, symbols, or the like. In some embodiments, the resist layer 15 is provided as a decorative layer, which may be protected by a protective layer.

REFERENCE SIGNS LIST 1 capacitive sensor (sensor, first embodiment)
1A sensor main body section
1A1 top surface portion
1A2 side surface portion
1B wiring connection section
2 capacitive sensor (sensor, modification of the first embodiment)
3 capacitive sensor (sensor, second embodiment)
4 capacitive sensor (sensor, third embodiment)
5 capacitive sensor (sensor, modification of the third embodiment)
10 sensor sheet
10*a* detection part
10*b* tail part
10*b*1 through-hole
10*c* top surface
10*d* back surface
11 film sheet
11*a* top surface
11*b* back surface
11*c* side surface
12 sensor electrode
12*a* first circuit pattern
12*b* second circuit pattern
13 terminal portion
14 wiring line
15 resist layer
16 bent portion
16*a* outer bent surface
16*b* inner bent surface
20,21 base member
20*a* top surface portion
20*b* side surface portion
20*c*, 21*c* bottom surface portion
20*d*, 21*d* bottom surface periphery
30 circuit board
31 connector
32 second casing

The invention claimed is:

1. A sensor comprising:
a base member; and
a sensor sheet including a film sheet, a plurality of sensor electrodes laid on the film sheet, and a plurality of wiring lines laid on the film sheet to conduct electricity to the plurality of sensor electrodes, wherein
the sensor sheet includes
a detection part held on the base member and including the plurality of sensor electrodes, and
a tail part extending from the detection part in a manner so as to face a bottom surface of the base member and including the plurality of wiring lines,
the tail part includes a bent portion bent on a bottom surface periphery of the base member toward the bottom surface of the base member, and
the plurality of wiring lines extending through the bent portion are laid on an outer bent surface of the film sheet in the bent portion.

2. The sensor according to claim 1, wherein
the plurality of wiring lines extending through the bent portion are arranged side by side in a direction crossing a direction in which the tail part extends, and
at least one of the plurality of wiring lines located in a bending contact site of the tail part in contact with at least the bottom surface periphery is laid on the outer bent surface.

3. The sensor according to claim 1, wherein the bent portion is bent along the bottom surface periphery in a manner so as to be in contact with the bottom surface periphery.

4. The sensor according to claim 1, wherein
the base member and the detection part constitute a sensor main body section, and
the sensor main body section is a three-dimensional figure including a top surface portion and a side surface portion.

5. The sensor according to claim 1, wherein
the base member on at least a side on which the bent portion of the tail part is disposed is in a form of a flat plate, and
the bottom surface periphery is a peripheral portion of the bottom surface of the base member.

6. The sensor according to claim 1, wherein at least a portion being part of the bottom surface periphery and facing the bent portion is arc-shaped.

7. The sensor according to claim 1, further comprising a resist layer with which the plurality of sensor electrodes and the plurality of wiring lines are overlaid.

8. The sensor according to claim 1, wherein the plurality of sensor electrodes are designed for a capacitive sensor that detects a change in capacitance.

* * * * *